United States Patent [19]
Kashitani et al.

[11] Patent Number: 5,625,183
[45] Date of Patent: Apr. 29, 1997

[54] ROTARY MIRROR SCANNER UNIT HAVING OPTICAL ANGULAR DISPLACEMENT SENSOR

[75] Inventors: Atsushi Kashitani; Satoshi Segawa, both of Tokyo, Japan

[73] Assignee: NEC Corporation, Tokyo, Japan

[21] Appl. No.: 490,572

[22] Filed: Jun. 15, 1995

[30] Foreign Application Priority Data

Jun. 15, 1994 [JP] Japan .................................. 6-133079
Jun. 20, 1994 [JP] Japan .................................. 6-137035

[51] Int. Cl.⁶ .............................. H04N 1/04; G03B 3/00
[52] U.S. Cl. ............... 250/236; 250/231.13; 250/237 G; 358/482; 358/497
[58] Field of Search ....................... 250/234, 235, 250/236, 230, 231.13, 231.14, 231.16, 231.17, 231.18, 237 G, 237 R; 358/474, 475, 482, 483, 494, 497

[56] References Cited

U.S. PATENT DOCUMENTS

| | | | |
|---|---|---|---|
| 3,538,333 | 11/1970 | Dorow | 250/236 |
| 3,538,334 | 11/1970 | Shaffer, Jr. | 250/236 |
| 4,638,156 | 1/1987 | Horikawa et al. | 250/235 |
| 5,159,192 | 10/1992 | Nishimura et al. | 250/231.16 |
| 5,223,710 | 6/1993 | Pavlak | 250/230 |
| 5,235,177 | 8/1993 | Hutchinson et al. | 250/231.13 |
| 5,245,172 | 9/1993 | Esslinger et al. | 250/201.2 |
| 5,247,173 | 9/1993 | Benchetrit et al. | 250/230 |

FOREIGN PATENT DOCUMENTS 62-291259  12/1987  Japan .

*Primary Examiner*—Edward P. Westin
*Assistant Examiner*—John R. Lee
*Attorney, Agent, or Firm*—Sughrue, Mion, Zinn, Macpeak & Seas

[57] ABSTRACT

In a scanner unit for An overhead image scanner, a rotatably mounted mirror reflects light from a surface to be scanned off to a focusing lens to form an optical image of a scanned line on a linear image sensor. An extension arm is connected to the minor for rotation therewith. To one end of the arm is attached an electromagnetic drive system and to the other end a light reflecting member which is formed with a multiplicity of microscopically spaced apart tracks running parallel to the length of the extension arm. A laser beam spot is formed on the reflecting member and a photodiode array detects reflections therefrom to produce a plurality of output signals representative of the amounts of reflections incident on different areas of the array. The outputs of the photodiode array are processed to produce a tracking error pulse when the minor is rotated by a predetermined amount of arc and a control current is supplied to the electromagnetic drive system so that the mirror is driven at a substantially constant speed. The tracking error pulse is supplied to the linear image sensor to cause the optical image of the scanned line to be converted to an electrical signal.

17 Claims, 5 Drawing Sheets

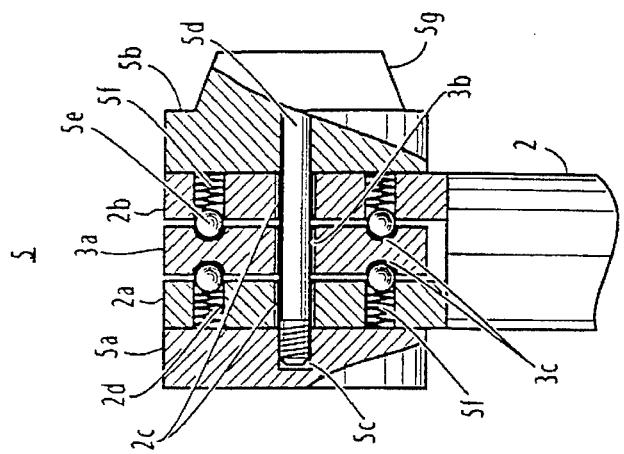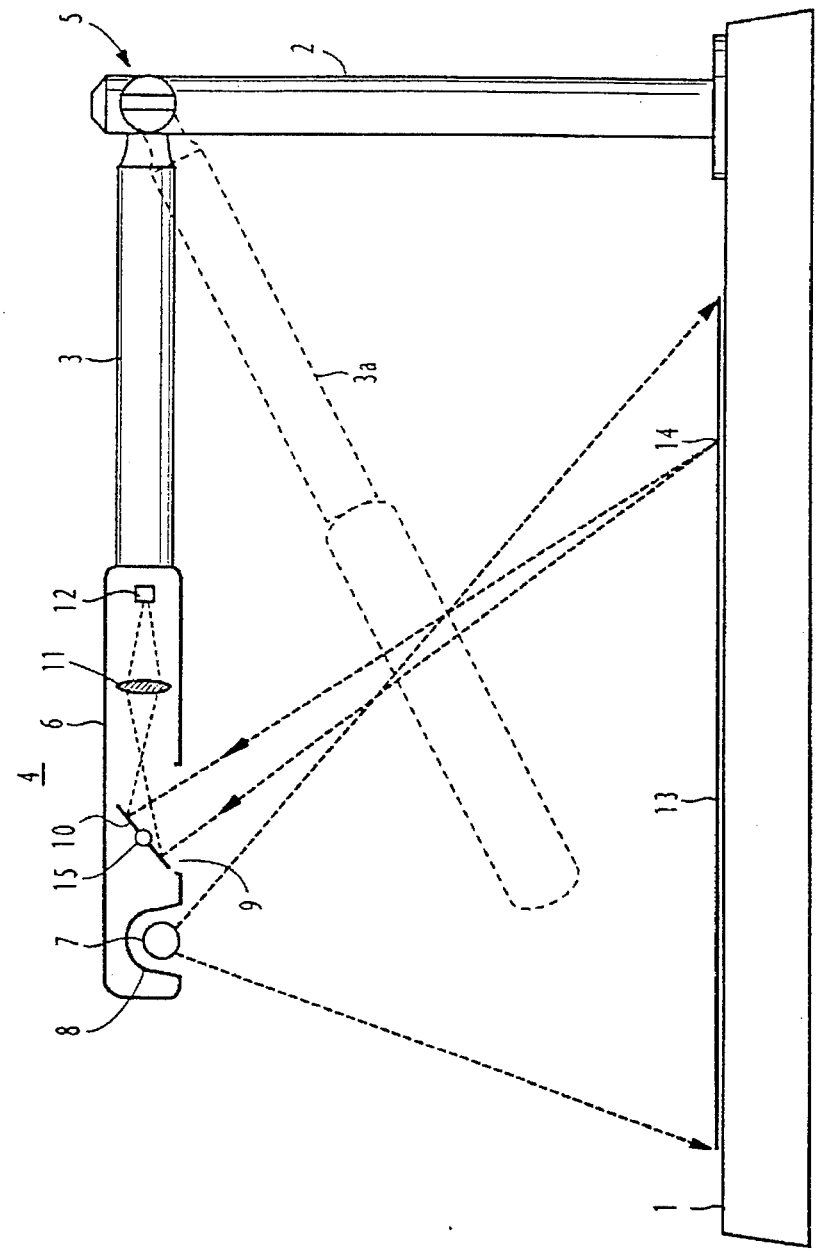

ROTARY MIRROR SCANNER UNIT HAVING OPTICAL ANGULAR DISPLACEMENT SENSOR

BACKGROUND OF THE INVENTION

1. Field of the Invention

The present invention relates generally to image scanners, and more specifically to an overhead image scanner and a scanner unit used for the overhead image scanner.

2. Description of the Related Art

A conventional overhead image scanner as shown and described in Japanese Provisional Patent Publication Sho-62-291259 includes a rotary mirror driven by a mechanical cam-and-rod drive system. Rays from a light source are focused by a lens onto the mirror where it is reflected off to a surface to be scanned to form highly illuminated line. Rays reflected from the illuminated line are collected by the mirror and focused by the lens to a linear image sensor. As the mirror is rotated by a small amount, the whole unit is advanced correspondingly so that the illuminated line is successively advanced by a line width and each line-scan output is produced.

However, the prior art scanner requires many mechanical moving parts which tend to wear with time.

SUMMARY OF THE INVENTION

It is therefore an object of the present invention to provide a compact scanner unit for an overhead image scanner which comprises a smaller number of simplified mechanical moving parts when compared to the conventional device.

According to the present invention, there is provided a scanner unit comprising a linear image sensor, a light source for illuminating a surface to be scanned, a rotatably mounted mirror for reflecting light from the surface, the mirror being elongated in the direction of an axis about which the mirror is rotatable, a focusing lens for collecting the light from the mirror and forming an optical image of a scanned line on the linear image sensor, and electromagnetic drive means for driving the mirror about the axis. An angular displacement sensor is provided for detecting when the mirror is rotated by a predetermined amount of arc and for producing an angular displacement signal. The angular displacement signal is processed to supply a current to the electromagnetic drive means so that the mirror is driven at a substantially constant speed and to supply a line-scan trigger pulse at the constant speed to the linear image sensor to cause the optical image of the scanned line to be converted to an electrical signal.

Preferably, the angular displacement sensor comprises an extension arm connected to the axis of the mirror for unitary rotation therewith, a light reflecting member attached to an end of the extension arm, the reflecting member being formed with a pattern comprising a multiplicity of tracks running parallel to the length of the extension arm, the tracks being spaced a microscopic distance apart. A laser beam spot is formed on the reflecting member and a photodiode array detects light rays returning from the reflecting member to produce a plurality of output signals representative of the amounts of the light rays incident on different areas of the array.

The output signals of the photodiode array are used to produce a tracking error pulse which is supplied to the linear image sensor as the line-scan trigger pulse when the laser beam spot crosses each one of the tracks on the reflecting member. A servo-controller is provided to successively increment a count value in response to the tracking error pulse, and determines the difference between the count value and a reference value at predetermined intervals. In accordance with the difference, the current supplied to the moving coil is produced.

BRIEF DESCRIPTION OF THE DRAWINGS

The present Invention will be described in further detail with reference to the accompanying drawings, in which:

FIG. 1 is a view in elevation of an overhead image scanner of the present invention;

FIG. 2 is a partial cross-sectional view of a fastening device;

DETAILED DESCRIPTION

Figure 3:
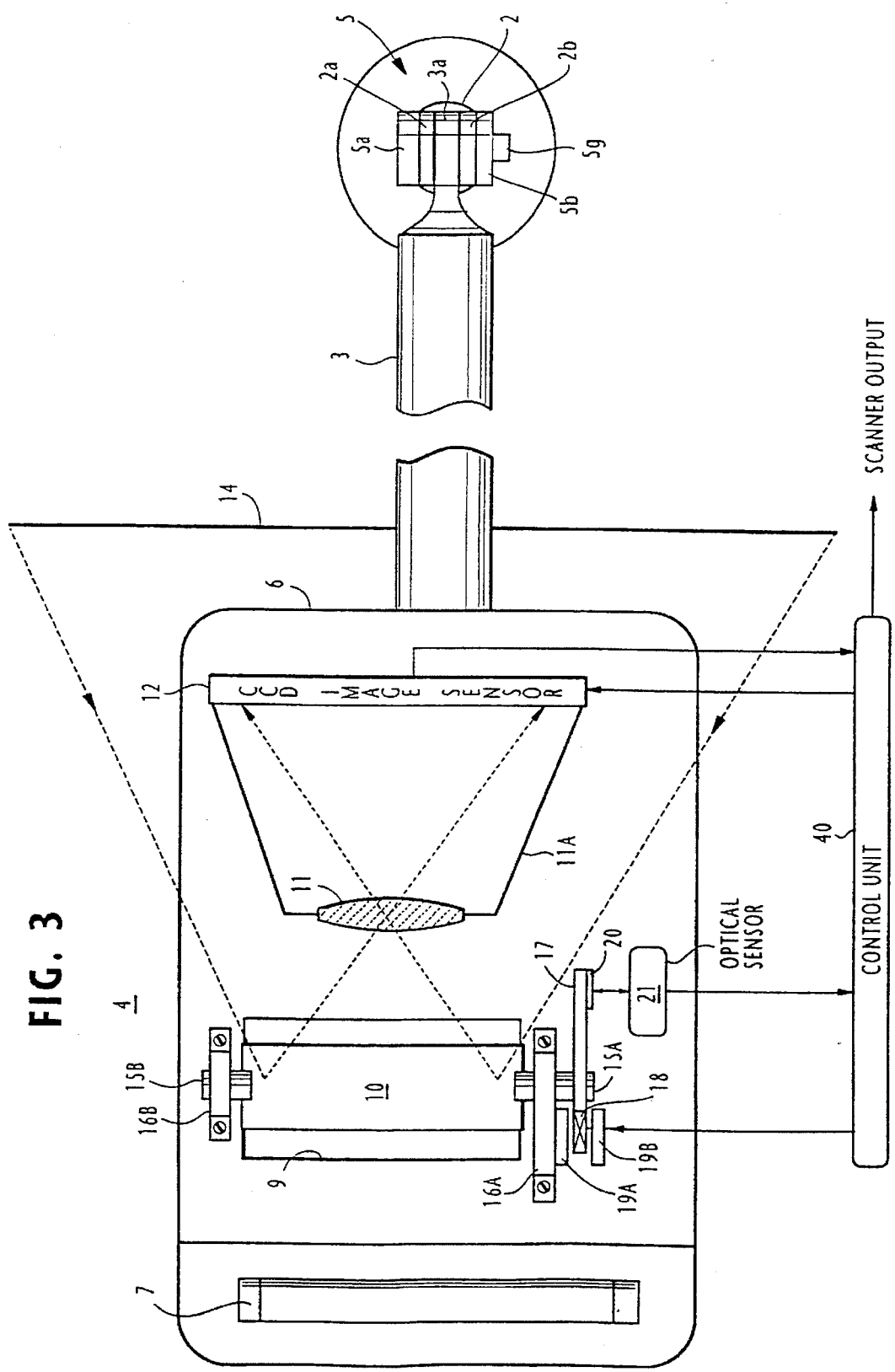
FIG. 3 is a plan view of the image sensor of the present invention.

As shown in FIGS. 1, 2 and 3, the overhead scanner of the present invention generally comprises a base 1, an upstanding arm 2 secured to the base for pivotally supporting a support arm 3, and an optical scanner unit 4 connected to the support arm 3. During use, the arm 3 is firmly secured to the upstanding arm 2 by means of a fastening device 5 so that the scanner unit 1 is held parallel to, and at a predetermined distance (e.g., 40 era) from, the upper surface of base 1. When not in use, the fastening arrangement 5 is loosened and the arm 3 is manually moved to a lower position as indicated by dotted lines 3a and tightened again so that the image scanner frees up space for other jobs.

As shown in detail in FIG. 2, the fastening device 5 includes a pair of opposite members 5a and 5b. The member 5a is formed with a toothed portion 5c and the member 5b is provided with a bolt 5d. The upper end of upstanding arm 2 is formed with a pair of spaced identical members 2a, 2b each having a center hole 2c and pair of holes 2d in diametrical positions with respect to the center hole 2c. The support arm 3 has a tapered end portion 3a which is formed with a center hole 3b and a pair of recesses 3c on each of its opposite sides. Balls 5e are biased against recesses 3c by springs 5f disposed within holes 2d. The center holes 2c and 3b are aligned and bolt 5f extends through the aligned holes to engage the toothed portion 5c of member 5a. The member 5b has a knob 5g. By manually turning the knob 5g, the members 5a and 5b are moved toward each other, tightening the members 2a and 2b against the opposite sides of the tapered end portion 3a and the scanner unit 4 is held firmly In working position. By loosening the bolt 5d and rotating the arm 3 against the pressure of springs 5f, the tapered end portion 3a causes balls 5e to be displaced from its recesses 3c. When the support 3 is moved to a desired position, the knob 5g is tightened. In this case, balls 5e are moved into the holes 2d against the corresponding springs.

Scanner unit 4 comprises a housing 6 secured to the distal end of arm 3, and a light source 7 suitably mounted within a shade 8 for uniformly illuminating the surface of base 1 on which a sheet 13 of textual or pictorial material of usually A-4 size is placed. A rectangular mirror 10 is firmly secured to aligned rotary shafts 15A, 15B so that the mirror rotates about the aligned axis of the shafts. Mirror 10 presents its reflecting surface toward the sheet 13 through an opening 9 to collect light rays from a scanned line 14 and reflect them off to a focusing lens 11 which is suitably mounted with respect to a linear CCD (charge-coupled device) image sensor 12. With the scanner unit 4 being held at the predetermined height from the base and the lens 11 being adjusted, the image of the scanned line 14 is precisely focused by lens 11 onto the image sensor 12 as the scanned line 14 moves along the length of the sheet 13.

It should be noted that the fastening device 5 can be further used to advantage to raise the scanner unit 4 to a desired level and turns the light source 7 on, so that it can be used for lighting purposes on a desk.

Rotary shafts 15A and 15B are rotatably mounted on a pair of trunnions 16A and 16B, respectively. To the shaft 15A are secured an extension arm 17 and a rotor (voice) coil 18 in diametrical positions of the shaft for unitary angular movement therewith.

A voice coil motor (VCM) of known design is provided by the coil 18 and a pair of stator magnets 19A, 19B secured together by crosspieces 22 and 23 of insulating material to provide a space in which the voice coil 18 is movably positioned as shown in FIG. 3. When successively energized by a current supplied from a control unit 40 in a manner to be described, the voice coil 18 is moved, causing the extension arm 17 to vary its angle relative to the upper surface of base 1. To the distal end of the arm 17 is attached a light reflecting member 20, and in proximity thereto is provided an optical sensor 21 for detecting when the mirror 10 is rotated by a predetermined amount of microscopic arc. This is achieved by directing a laser beam from the optical sensor 21 to the surface of the member 20, where the beam is diffracted by a pattern formed thereon and sensing a beam that returns therefrom. The output of optical sensor 21 is applied to the control unit 40 where it is processed in a feedback loop to produce a current supplied to the voice coil 18. The extension arm 17 and the optical sensor 21 form an angular displacement sensor.

Figure 5:
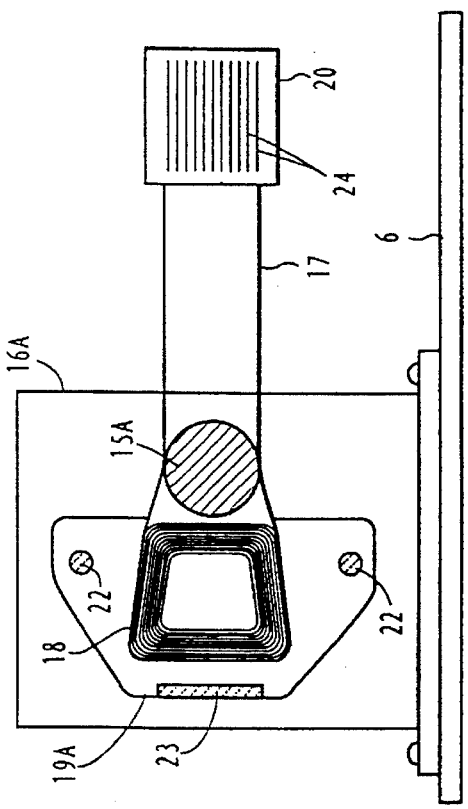
FIG. 5 is a side view of a reflecting member mounted on the distal end of a rotary shaft for unitary rotation with the mirror.

As clearly shown in FIG. 5, the pattern formed on the light reflecting member 20 is a multiplicity of tracks 24 that run parallel to the length of extension arm 17. The number of tracks 24 corresponds to the maximum number of lines that can be scanned on a A-4 size sheet, typically 3000 scanning lines. If the arm 17 is driven in a counterclockwise direction, the locus of the laser beam on the reflecting member 20 will form an arc that starts from the uppermost track and ends at the lowermost track. Materials suitable for the reflecting member 20 are the same as those of optical discs such as compact discs and magneto-optic discs. Tracks 24 are formed in the same way as those of such known discs. It is seen that a small piece of CD or MO discs may be used in the present invention by cutting out a segment from conventional discs.

In a practical aspect, if tracks 24 are formed with a pitch of 1.6 μm, a maximum of three-thousand lines can be scanned on a A-4 size sheet in the lengthwise direction using an extension arm 17 of 13.3 mm in length. If the CCD sensor 12 has a resolution of 2000 pixels, an A-4 size text can be scanned with a resolution of 3000×2000 pixels.

Figure 7:
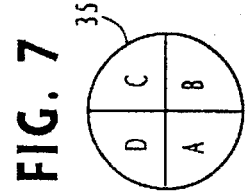
FIG. 7 is an enlarged view of the photodiode array of the angular displacement sensor.
Figure 6:
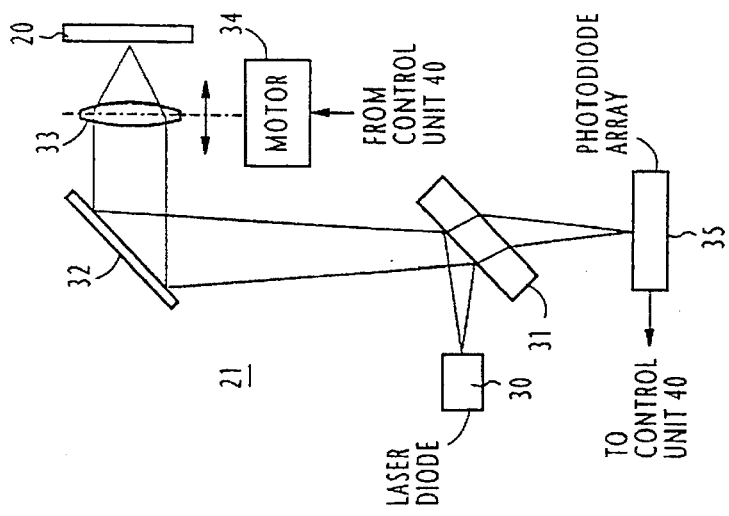
FIG. 6 is a simplified illustration of an angular displacement sensor.
Figure 4:
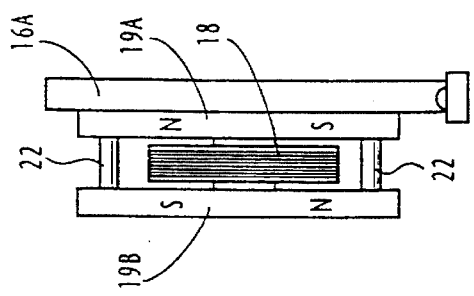
FIG. 4 is an end view of a voice coil motor for driving a rotary mirror.

As illustrated in FIG. 6, the optical sensor 21 consists of a laser diode 30, and a beam splitter 31 for reflecting a laser beam from diode 30 off to a mirror 32. Light rays Incident on the mirror 32 are reflected off to an object lens 33 where they are focused onto the surface of the reflecting member 20. Object lens 33 is arranged to be moved by a motor 34 to adjust its focal point on the reflecting member 20 according to a control current supplied from the control unit 40. The light incident on the reflecting member 20 is reflected off and collected by the lens 33 onto the mirror 32 where it is directed towards a photodiode array 35 through the beam splitter 31. Photodiode array 35 comprises a set of four photodiodes arranged in quadrants A, B, C and D of a circle as shown in FIG. 7. Depending on the location of the beam spot on a given track, the reflecting light rays are diffracted and made to be incident on different areas of the photodiode array 35.

Figure 8:
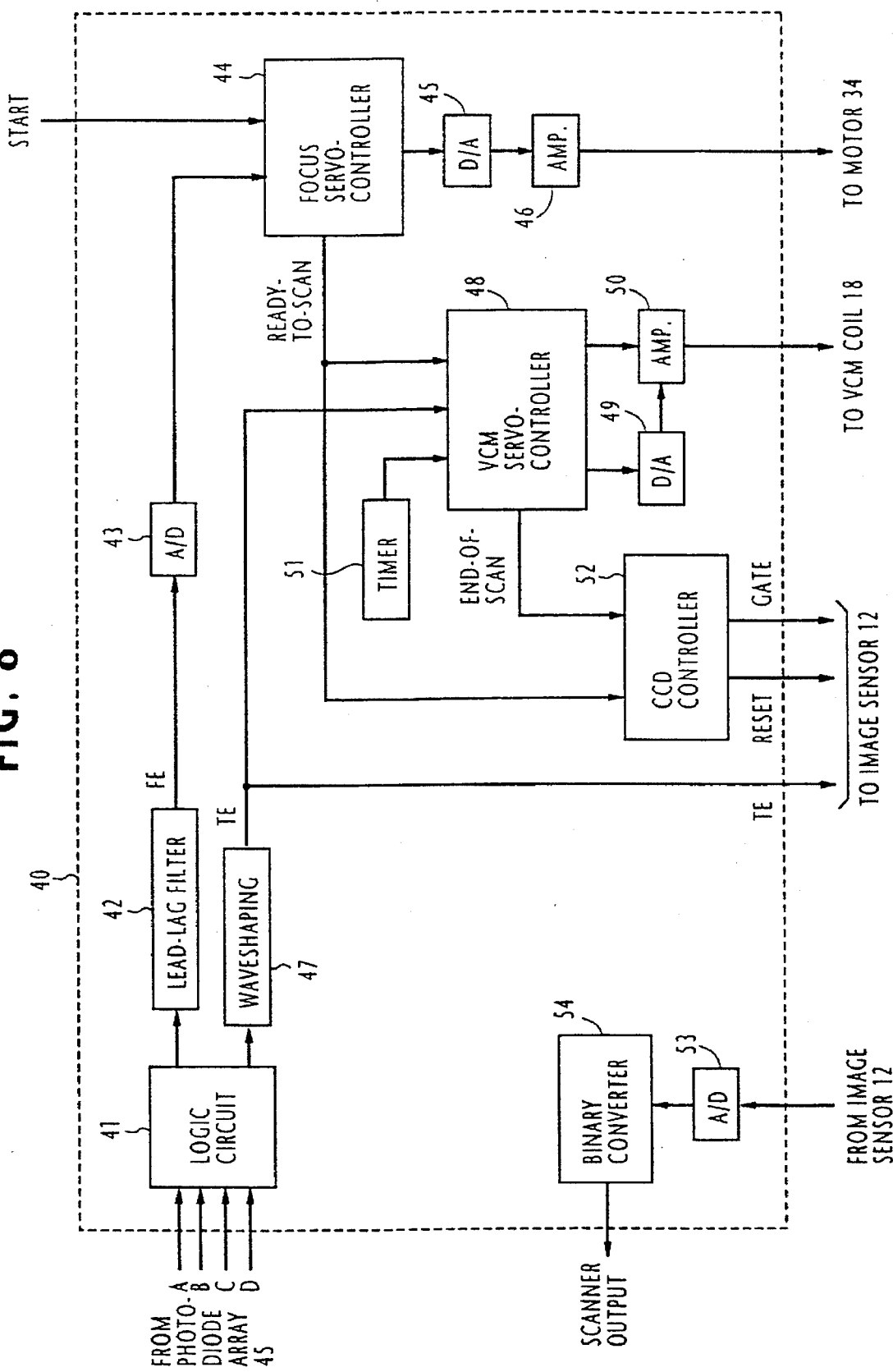
FIG. 8 is a block diagram of the control unit of the present invention.

Details of the control unit 40 are shown in FIG. 8. Control unit 40 includes an arithmetic logic circuit 41 of the type used in the compact-disc technology for focusing and tracking error control. Arithmetic logic circuit 41 receives the output signals of the elements A, B, C and D of photodiode array 35 to produce a focusing error signal (B+D)−(A+C) and a tracking error signal A−C (or D−B). The focusing error signal is applied to a lead-lag filter 42 where the signal is converted to an analog value for A/D conversion by an analog-to-digital converter 43. The output of A/D converter 43 is coupled to a focus servo-controller 44 which is activated in response to a start signal triggered by the user. Focus servo-controller 44 produces a digital output which is converted to an analog signal by a digital-to-analog converter 45. The output of D/A converter 45 is amplified and supplied to the focusing motor 34. As in the conventional technique used in compact disc players, the servo-controller 44 controls the motor 34 in such a manner that the output of A/D converter 43 is reduced to a minimum. The tracking error signal from arithmetic logic circuit 41 is processed by a waveshaping circuit 47 to produce a pulse (TE) when the beam spot on the reflecting member 20 successively traverses each one of the tracks 24. The TE pulse is applied to a VCM servo-controller 48 as well as to the CCD sensor 12 as a start timing pulse for each line scan.

When the output of A/D converter 43 is reduced to zero immediately following the receipt of the start signal, the beam spot has been correctly positioned on the reflecting member 20, and the focus servo-controller 44 now supplies a ready-to-scan signal to VCM servo-controller 48. In response to each TE pulse, the VCM servo-controller 48 increments a count value, and compares it with a reference value at periodic intervals determined by a timer 51 to produce a digital difference signal. This signal is converted to analog form by a D/A converter 49 and applied to an amplifier 50 whose output is connected to the VCM coil 18. The VCM servo-controller 48 controls the direction of current supplied from the amplifier 50 to the coil 18 depending on the sign of the difference signal.

Figure 9:
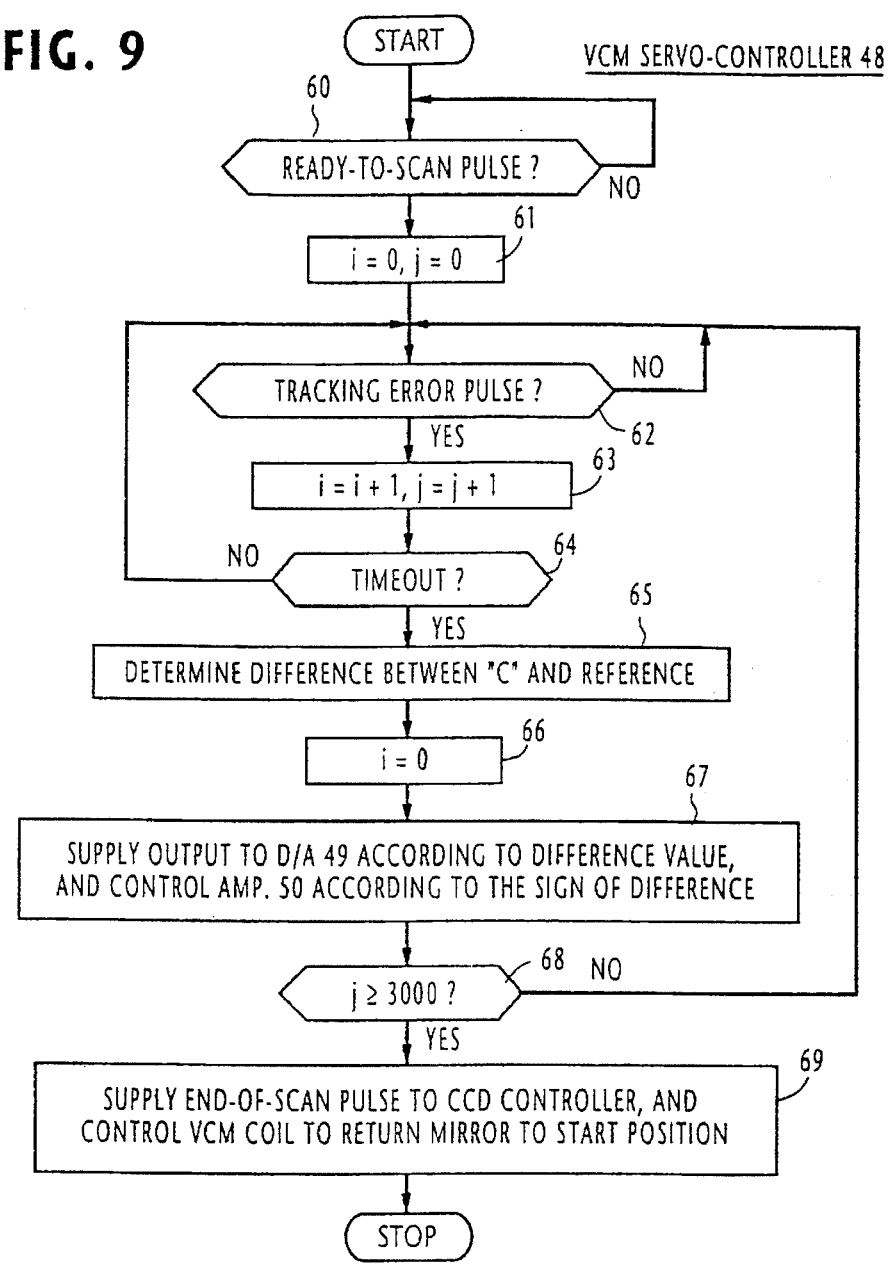
FIG. 9 is a flowchart of the operation of the VCM servo-controller of the control unit.

In more detail, the operation of the VCM servo-controller 48 is illustrated in the flowchart of FIG. 9. The operation of servo-controller 48 starts with block 60 when a ready-to-scan pulse is received from controller 44. Counter variables "i" and "j" are initialized in block 61, and control proceeds to decision block 62 to check to see if a tracking error (TE) pulse is received from waveshaping circuit 47. If it is, control proceeds to block 63 to increment the counter variables "i" and "j" by 1. Exit then is to block 64 to determine whether a time-out period is reached in timer 51. If the answer is negative, control returns to block 62 to continue the counting process. When a periodic time-out period expires, control branches at decision block 64 to block 65 to determine the difference value between the count value "i" and a predetermined reference value. The variable "i" is then reset to zero at block 66, and control advances to block 67 to supply a control signal to D/A converter 49 according to the difference value and control the amplifier 50 so that the direction of current supplied therefrom to the VCM coil 18 is varied according to the sign of the difference value. At decision block 68, control determines whether the counter variable "j" is equal to or greater than the maximum number of scanning lines, i.e., 3000. If not, control returns to block 62 to continue the VCM servo-control. If the decision at block 68 is affirmative, control advances to block 69 to supply an end-of-scan pulse to a CCD controller 52 and controls the VCM coil 18 using amplifier 50 to return the mirror 10 to the starting position. In this way, the mirror 10 is driven at a substantially constant speed.

It can be seen that by increasing the length of arm 17 and/or increasing the number of tracks 24 the number of scanning lines can be increased as desired.

Figure 10:
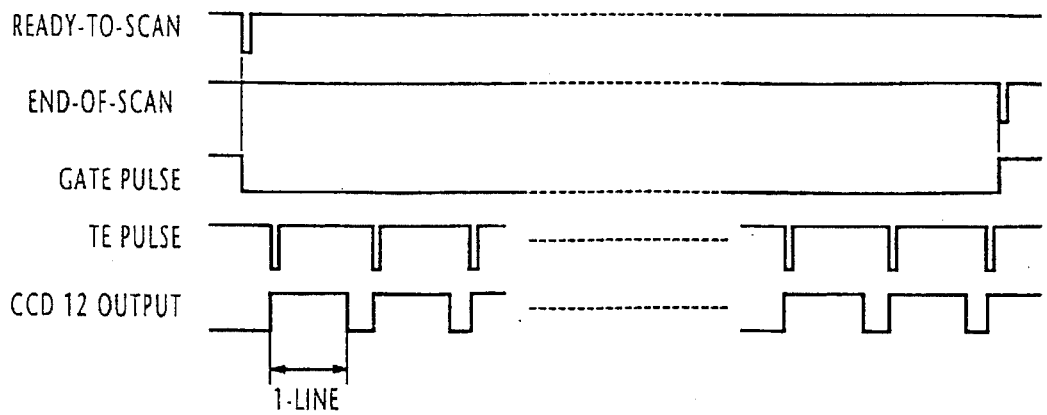
FIG. 10 is a timing diagram associated with the CCD controller of the control unit.

The CCD controller 52 is responsive to the ready-to-scan pulse from the focus servo-controller 44 for producing a gate pulse, as shown in FIG. 10. The gate pulse is used by the CCD sensor 12 to allow tracking error pulses to be supplied to all the pixel elements of the sensor 12 to produce a CCD output for each line scan. In response to the end-of-scan pulse from controller 48, CCD controller 52 supplies a reset pulse to the image sensor 12. The output signal of the CCD image sensor 12 is an analog signal which is converted to digital form by an A/D converter 53. A binary converter 54 is connected to the output of A/D converter 53 to convert the digital value to one of two discrete values depending on whether it is higher or lower than a predetermined threshold. As a scanner output, the output of the binary converter 54 is supplied to external utilization circuitry such as personal computers or workstations.

What is claimed is:

1. A scanner unit comprising:

a linear image sensor;

a light source for illuminating a surface to be scanned;

a rotatably mounted mirror for reflecting light from said surface, said mirror being elongated in the direction of an axis about which said minor is rotatable;

a focusing lens for collecting the light from said mirror and forming an optical image of a scanned line on said linear image sensor;

electromagnetic drive means for driving said mirror about said axis;

an angular displacement sensor for detecting when said mirror is rotated by a predetermined amount of arc and producing an angular displacement signal; and control means for processing said angular displacement signal and supplying a current to said electromagnetic drive means so that said mirror is driven at a substantially constant speed and for supplying a line-scan trigger pulse at said constant speed to said linear image sensor to cause said optical image of the scanned line to be converted to an electrical signal.

2. A scanner unit as claimed in claim 1, wherein said angular displacement sensor comprises:

an extension arm connected to the axis of said mirror for unitary rotation with said mirror;

a light reflecting member attached to an end of said extension arm, said reflecting member being formed with a pattern comprising a multiplicity of tracks running parallel to the length of said extension arm, said tracks being spaced a microscopic distance apart;

means for forming a laser beam spot on the reflecting member; and a photodiode array for detecting light rays returning from the reflecting member and producing therefrom a plurality of output signals representative of the amount of the light rays incident on different areas of the array.

3. A scanner unit as claimed in claim 1 or 2, wherein said electromagnetic drive means comprises a moving coil connected to the axis of said minor for rotation with said mirror and a stator stationarily mounted in proximity to the moving coil, said moving coil being movable in response to said current from said control means.

4. A scanner unit as claimed in claim 2, wherein said control means comprises:

means for deriving a tracking error pulse from the output signals of said photodiode array and applying the tracking error pulse to said linear image sensor as said line-scan trigger pulse, the tracking error pulse being time-coincident with said laser beam spot crossing one of said tracks on the reflecting member; and servo-control means for successively incrementing a count value in response to said tracking error pulse, determining a difference between the count value and a reference value at predetermined intervals, and producing said current supplied to said electromagnetic drive means in accordance with said difference.

5. A scanner unit as claimed in claim 4, wherein said control means comprises:

means for deriving a focusing error signal from the output signals of said photodiode array; and focusing servo-control means for controlling said laser beam spot so that said focusing error signal is substantially reduced to zero.

6. An overhead image scanner comprising:

a base having a surface;

an upstanding arm secured to said base;

a support arm pivotally secured to an end of said upstanding arm;

fastening means for holding said support arm parallel to said surface; and a scanner unit attached to an end of said support arm, the scanner unit comprising:

a linear image sensor;

a light source for illuminating the surface of said base;

a rotatably mounted mirror for reflecting light from said surface, said mirror being elongated in the direction of an axis about which said mirror is rotatable;

a focusing lens for collecting the light from said mirror and forming an optical image of a scanned line on said linear image sensor;

electromagnetic drive means for driving said mirror about said axis;

an angular displacement sensor for detecting when said mirror is rotated by a predetermined amount of arc and producing an angular displacement signal; and control means for processing said angular displacement signal and supplying a current to said electromagnetic drive means so that said mirror is driven at a substantially constant speed and for supplying a line-scan trigger pulse at said constant speed to said linear image sensor to cause said optical image of the scanned line to be converted to an electrical signal.

7. An overhead image scanner as claimed in claim 6, wherein said angular displacement sensor comprises:

an extension arm connected to the axis of said mirror for unitary rotation with said mirror;

a light reflecting member attached to an end of said extension arm, said reflecting member being formed with a pattern comprising a multiplicity of tracks running parallel to the length of said extension arm, said tracks being spaced a microscopic distance apart;

means for forming a laser beam spot on the reflecting member; and a photodiode array for detecting light rays returning from the reflecting member and producing therefrom a plurality of output signals representative of the amount of the light rays incident on different areas of the array.

8. An overhead image scanner as claimed in claim 6 or 7, wherein said electromagnetic drive means comprises a moving coil connected to the axis of said mirror for rotation with said mirror and a stator stationarily mounted in proximity to the moving coil, said moving coil being movable in response to said current from said control means.

9. An overhead image scanner as claimed in claim 7, wherein said control means comprises:

means for deriving a tracking error pulse from the output signals of said photodiode array and applying the tracking error pulse to said linear image sensor as said line-scan trigger pulse, the tracking error pulse being time-coincident with said laser beam spot crossing one of said tracks on the reflecting member; and servo-control means for successively incrementing a count value in response to said tracking error pulse, determining a difference between the count value and a reference value at predetermined intervals, and producing said current supplied to said electromagnetic drive means in accordance with said difference.

10. An overhead image scanner as claimed in claim 9, wherein said control means comprises:

means for deriving a focusing error signal from the output signals of said photodiode array; and focusing servo-control means for controlling said laser beam spot so that said focusing error signal is substantially reduced to zero.

11. An overhead image scanner as claimed in claim 6, wherein said fastening means comprises a pair of mutually engageable members, wherein said upstanding arm is formed with a pair of oppositely facing members at one end thereof, and said support arm is formed with a tapered portion at an end thereof, said tapered portion being disposed between said pair of oppositely facing members, said tapered portion and said oppositely facing members having aligned holes, one of said engageable members having a bolt extending through the aligned holes to engage with the other engageable member.

12. In a scanner unit comprising a linear image sensor, a light source for illuminating a surface to be scanned, a rotatably mounted mirror for reflecting light from said surface, said mirror being elongated in the direction of an axis about which said mirror is rotatable, a focusing lens for collecting the light from said mirror and forming an optical image of a scanned line on said linear image sensor, and electromagnetic drive means for driving said mirror about said axis, a method comprising the steps of:

a) detecting when said mirror is rotated by a predetermined amount of arc to produce an angular displacement signal and supplying the angular displacement signal to said linear image sensor to convert said optical image of the scanned line to an electrical signal;

b) repeating the step (a) for a predetermined period and servo-controlling said electromagnetic drive means in accordance with the number of angular displacement signals produced during said period so that said mirror is driven at a substantially constant speed; and c) repeating the steps (a) and (b).

13. In a scanner unit comprising a linear image sensor, a light source for illuminating a surface to be scanned, a rotatably mounted mirror for reflecting light from said surface, said mirror being elongated in the direction of an axis about which the said mirror is rotatable, a focusing lens for collecting the light from said mirror and forming an optical image of a scanned line on said linear image sensor, electromagnetic drive means for driving said mirror about said axis, an extension arm connected to the axis of said minor for unitary rotation with said mirror, a light reflecting member attached to the distal end of said extension arm, said reflecting member being formed with a pattern comprising a multiplicity of tracks running parallel to the length of said extension arm, said tracks being spaced a microscopic distance apart, means for forming a laser beam spot on the reflecting member, and a photodiode array for detecting light rays returning from the reflecting member and producing therefrom a plurality of output signals representative of the amount of the light rays incident on different areas of the array, a method comprising the steps of:

a) deriving a tracking error pulse from the output signals of said photodiode array and causing said linear image sensor to convert said optical image of the scanned line to an electrical signal in response to the occurrence of the tracking error pulse; and b) incrementing a count value in response to said tracking error pulse;

c) repeating the steps (a) and (b) for a predetermined period and determining a difference value between the count value and a reference value at predetermined intervals;

d) controlling said electromagnetic drive means in accordance with said difference value; and e) repeating the steps (a) to (d).

14. A scanner unit comprising:

an image sensor a light source for illuminating a surface to be scanned;

a mirror rotatably mounted by an axial shaft, said mirror reflecting light from said surface;

a focusing lens for collecting the reflected light from said mirror and forming an optical image on said image sensor;

electromagnetic drive circuitry for rotating said mirror by said axial shaft;

an angular displacement unit physically linked to said axial shaft for producing an angular displacement signal; and control circuitry for processing said angular displacement signal and supplying a current to said electromagnetic drive circuitry so that said mirror is rotated at a substantially constant speed and for supplying a trigger pulse corresponding to said constant speed to said image sensor to cause said optical image to be converted to an electrical signal.

15. A scanner unit as claimed in claim 14, wherein said angular displacement unit comprises:

an extension arm connected to said axial shaft of said mirror for unitary rotation with said axial shaft;

a light reflecting member attached to an end of said extension arm, said reflecting member being formed with a pattern comprising a multiplicity of tracks running parallel to the length of said extension arm, said tracks being spaced a microscopic distance apart;

means for forming a laser beam spot on the reflecting member; and a photodiode array for detecting light rays returning from the reflecting member and producing therefrom a plurality of outputs signals representative of the amount of the light rays incident on different areas of the array.

16. A scanner unit as claimed in claim 15, wherein said control means comprises:

means for deriving a tracking error pulse from the output signals of said photodiode array and applying the tracking error pulse to said image sensor as said trigger pulse, the tracking error pulse being time-coincident with said laser beam spot crossing one of said tracks on the reflecting member; and servo-control means for successively incrementing a count value in response to said tracking error pulse, determining a difference between the count value and a reference value at predetermined intervals, and producing said current applied to said electromagnetic drive means in accordance with said difference.

17. A scanner unit as claimed in claim 16, wherein said control circuitry comprises:

means for deriving a focusing error signal from the output signals of said photodiode array; and focusing servo-control means for controlling said laser beam spot so that said focusing error signal is substantially reduced to zero.

* * * * *